United States Patent
Laib

(10) Patent No.: US 11,161,591 B2
(45) Date of Patent: Nov. 2, 2021

(54) INSULATION SEALING SYSTEM

(71) Applicant: The Boeing Company, Chicago, IL (US)

(72) Inventor: Trevor M. Laib, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 339 days.

(21) Appl. No.: 16/030,543

(22) Filed: Jul. 9, 2018

(65) Prior Publication Data

US 2020/0010170 A1  Jan. 9, 2020

(51) Int. Cl.
*B64C 1/40* (2006.01)
*F16B 5/06* (2006.01)
*A44B 13/00* (2006.01)

(52) U.S. Cl.
CPC ............ *B64C 1/403* (2013.01); *F16B 5/0685* (2013.01); *A44B 13/0058* (2013.01)

(58) Field of Classification Search
CPC .......... B64C 1/403; B64C 1/406; B64C 1/40; A44B 13/007; A44B 13/0058; A44B 13/0064; A44B 13/0082; F16B 11/006
See application file for complete search history.

(56) References Cited

U.S. PATENT DOCUMENTS

| | | | |
|---|---|---|---|
| 3,392,225 A * | 7/1968 | Phelan | B29C 66/474 264/262 |
| 3,399,435 A * | 9/1968 | Ackerman, Jr. | A43C 5/00 16/2.1 |
| 3,516,111 A * | 6/1970 | Heyman | F16L 5/00 16/2.1 |
| 3,884,006 A * | 5/1975 | Dietlein | F16B 5/01 52/787.12 |
| 3,892,099 A * | 7/1975 | Worgan | F16B 5/00 52/479 |
| 4,010,519 A * | 3/1977 | Worthing | F16B 19/10 403/404 |
| 4,337,603 A * | 7/1982 | Davidson | E04C 2/521 138/156 |
| 4,729,705 A * | 3/1988 | Higgins | F16B 5/01 411/174 |
| 5,435,679 A * | 7/1995 | Barry | A41H 37/005 244/131 |
| 5,553,368 A | 9/1996 | Barry | |
| 5,827,598 A | 10/1998 | Larsen et al. | |
| 5,866,231 A | 2/1999 | Bodin et al. | |
| 6,264,412 B1 * | 7/2001 | Nakamura | F16B 5/01 411/107 |
| 9,441,660 B2 * | 9/2016 | Meyers | F16B 5/01 |
| 2008/0092937 A1 * | 4/2008 | Mitchell | H01L 35/30 136/200 |
| 2009/0226663 A1 | 9/2009 | Hutter, III | |

(Continued)

OTHER PUBLICATIONS

GB Intellectual Property Office Search Report, dated Nov. 28, 2019, regarding Application No. GB1908722.0, 1 page.

*Primary Examiner* — Christopher D Hutchens
(74) *Attorney, Agent, or Firm* — Yee & Associates, P.C.

(57) ABSTRACT

An insulation insert comprises a hollow cylinder formed of a closed cell foam, a first adhesive layer on a first face of the hollow cylinder, a flange of the closed cell foam extending from the hollow cylinder, and a second adhesive layer on a second face of the flange.

22 Claims, 11 Drawing Sheets

(56) References Cited

U.S. PATENT DOCUMENTS

| | | | |
|---|---|---|---|
| 2014/0373359 A1* | 12/2014 | Schomaker | B64D 45/02 |
| | | | 29/897.2 |
| 2015/0300396 A1 | 10/2015 | Balderrama et al. | |
| 2017/0268546 A1* | 9/2017 | Stilin | F16B 5/02 |
| 2018/0029688 A1* | 2/2018 | Connelly | B64C 1/40 |
| 2018/0274701 A1* | 9/2018 | Steverson | B29C 66/01 |

* cited by examiner

INSULATION SEALING SYSTEM

BACKGROUND INFORMATION

1. Field

The present disclosure relates generally to insulation blankets in aircraft and, more specifically, to installing insulation blankets in an aircraft. Yet more specifically, the present disclosure relates to sealing a penetration of an insulation blanket using an insulation sealing system during installation of the insulation blanket.

2. Background

During flight, temperatures outside of an aircraft are significantly lower than the temperatures inside the aircraft. Insulation blankets are present inside the fuselage of the aircraft to protect passengers and crew within the aircraft from the outside temperatures.

Aircraft systems, such as ducts, tubes, and wire bundles, run through aircraft. These aircraft systems have attach points onto stringers of the airframe of the aircraft.

These attach points create penetrations through the insulation blankets to connect to the stringers. These penetrations through the insulation blankets are potential sources of water ingress into the insulation blankets, which can result in undesirable conditions.

Therefore, it would be desirable to have a method and apparatus that take into account at least some of the issues discussed above, as well as other possible issues. For example, it would be desirable to have attach points for aircraft systems that deter water ingress into insulation blankets.

SUMMARY

An illustrative embodiment of the present disclosure provides an insulation sealing system. The insulation sealing system comprises an insulation insert and a stringer clip. The insulation insert comprises a hollow cylinder formed of a closed cell foam, a first adhesive layer on a first face of the hollow cylinder, a flange of the closed cell foam extending from the hollow cylinder, and a second adhesive layer on a second face of the flange. The stringer clip has a mounting post configured to provide an interference fit with a hole of the hollow cylinder.

Another illustrative embodiment of the present disclosure provides an insulation insert. The insulation insert comprises a hollow cylinder formed of a closed cell foam, a first adhesive layer on a first face of the hollow cylinder, a flange of the closed cell foam extending from the hollow cylinder, and a second adhesive layer on a second face of the flange.

Yet another illustrative embodiment of the present disclosure provides a method. A first hole having a first diameter is punched through a first face of an insulation blanket and a filler of the insulation blanket. A second hole having a second diameter is punched through a second face of the insulation blanket, wherein the second hole is concentric with the first hole, and wherein the second diameter is smaller than the first diameter. An insulation insert is installed within the first hole, the insulation insert comprising a hollow cylinder formed of a closed cell foam, a first adhesive layer on a first face of the hollow cylinder, a flange of the closed cell foam extending from the hollow cylinder, and a second adhesive layer on a second face of the flange.

A further illustrative embodiment of the present disclosure provides a method. A hollow cylinder is punched from a sheet of closed cell foam. A disc is punched from a second sheet of closed cell foam. The hollow cylinder is bonded to the disc to form an insulation insert comprising the hollow cylinder, a first adhesive layer on a first face of the hollow cylinder, a flange extending from the hollow cylinder, and a second adhesive layer on a second face of the flange, wherein the flange is formed by the disc.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
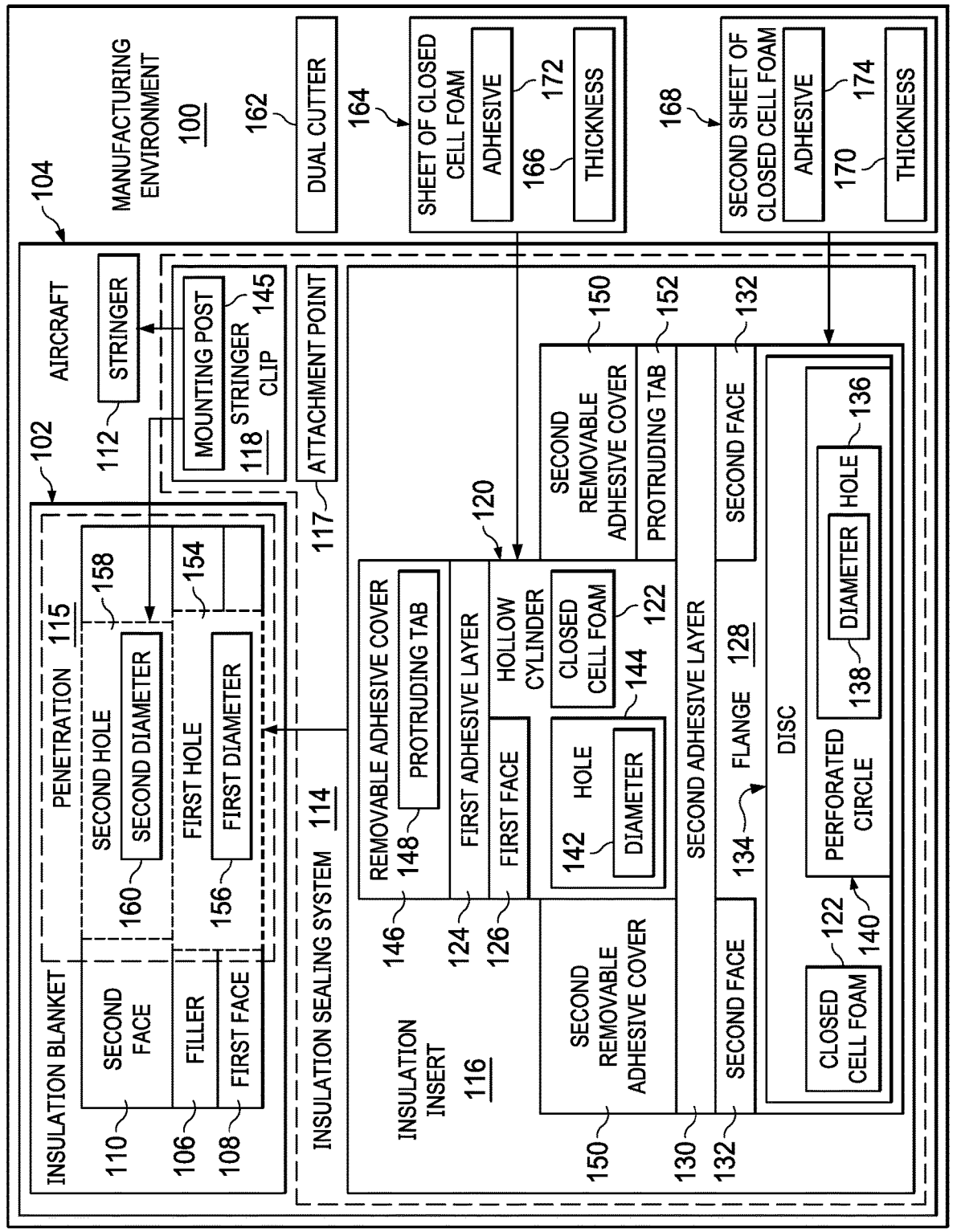
FIG. 1 is an illustration of a block diagram of a manufacturing environment in which an insulation sealing system is used in accordance with an illustrative embodiment.

The illustrative embodiments recognize and take into account one or more different considerations. For example, the illustrative embodiments recognize and take into account that it is desirable to design attach points through insulation blankets that deter or prevent water from entering through these attach points.

The illustrative embodiments recognize and take into account that designs for attach points currently exist. The illustrative embodiments recognize and take into account that some conventional attach points are installed completely within an aircraft. In these examples, the conventional attach points are installed through an insulation blanket at the stringers of the aircraft.

The illustrative embodiments recognize and take into account that some conventional attach points are partially installed outside an aircraft. For example, a conventional attach point may have a penetration through the insulation blanket formed and sealed outside of the aircraft.

The illustrative embodiments recognize and take into account that pre-sealed penetration locations may take an undesirably large amount of engineering time to pre-design the insert/penetration locations. The illustrative embodiments recognize and take into account that pre-sealed penetration locations result in less design change flexibility. The illustrative embodiments recognize and take into account that changes to aircraft systems design may result in changes to the desired penetration locations. The illustrative embodiments recognize and take into account that with pre-sealed penetration locations in insulation blankets, these changes to the insulation blankets may not be possible on the fly. The illustrative embodiments recognize and take into account that with pre-sealed penetration locations in insulation blankets, the design of the insulation blanket may be more difficult than desired to change.

The illustrative embodiments recognize and take into account that conventional designs for attach points may not completely prevent water ingress. The illustrative embodiments recognize and take into account that it would be desirable to present a design for attach points with better sealing capabilities.

The illustrative embodiments also recognize and take into account that at least one of installation time or installation difficulty for conventional attach points may be undesirably high. The illustrative embodiments recognize and take into account that it would be desirable to present a design for attach points that have at least one of: fewer installation steps, less installation time, or less installation difficulty.

The illustrative embodiments recognize and take into account that some existing attach points are formed of solid plastic. The illustrative embodiments also recognize and take into account that it is desirable to reduce weight of an aircraft. The illustrative embodiments recognize and take into account that decreasing the weight of an aircraft increases the fuel efficiency of an aircraft. The illustrative embodiments recognize and take into account that decreasing the weight of an aircraft may increase the capacity for additional cargo or passengers.

Turning now to FIG. 1, an illustration of a block diagram of a manufacturing environment in which an insulation sealing system is used is depicted in accordance with an illustrative embodiment. Manufacturing environment 100 is an environment in which insulation blanket 102 is installed within aircraft 104. Insulation blanket 102 has filler 106 between first face 108 and second face 110.

Insulation blanket 102 is both sealed and secured to stringer 112 using insulation sealing system 114. Insulation sealing system 114 seals penetration 115 through insulation blanket 102. In some illustrative examples, insulation sealing system 114 forms attachment point 117 for an aircraft system, such as at least one of a duct, a tube, or a wire bundle.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

Insulation sealing system 114 comprises insulation insert 116 and stringer clip 118. Insulation insert 116 comprises hollow cylinder 120 formed of closed cell foam 122, first adhesive layer 124 on first face 126 of hollow cylinder 120, flange 128 of closed cell foam 122 extending from hollow cylinder 120, and second adhesive layer 130 on second face 132 of flange 128.

Closed cell foam 122 is selected to meet standards for at least one of strength, water permeability, and fireproofing. It is desirable for closed cell foam 122 to be waterproof. It is also desirable for closed cell foam 122 to be fireproof. Closed cell foam 122 is any desirable material, such as polyvinylidene fluoride (PVDF).

In some illustrative examples, flange 128 is disc 134 bonded to hollow cylinder 120. In these illustrative examples, disc 134 is bonded to hollow cylinder 120 using any desirable method. In some illustrative examples, disc 134 is bonded to hollow cylinder 120 using second adhesive layer 130. In other illustrative examples, disc 134 is bonded to hollow cylinder 120 using a different bonding material than second adhesive layer 130.

In some illustrative examples, disc 134 is a uniform disc of closed cell foam 122 without any openings. In some other illustrative examples, disc 134 has hole 136 extending through disc 134. In these illustrative examples, hole 136 is concentric with disc 134. In some of these illustrative examples, hole 136 has diameter 138 configured to receive a fastener.

In some illustrative examples, disc 134 comprises perforated circle 140 concentric with disc 134. In these illustrative examples, perforated circle 140 extends partially through closed cell foam 122 of disc 134. When present, perforated circle 140 increases the uses of insulation insert 116. In some illustrative examples, when disc 134 comprises perforated circle 140, hole 136 is enlarged by removing perforated circle 140 from disc 134. In some illustrative examples, when disc 134 comprises perforated circle 140, hole 136 is created by removing perforated circle 140 from disc 134.

Hollow cylinder 120 has hole 144 with diameter 142. In some illustrative examples, diameter 142 of hole 144 of hollow cylinder 120 is configured to provide an interference fit with mounting post 145 of stringer clip 118.

Insulation insert 116 includes removable adhesive cover 146 contacting first adhesive layer 124. As depicted, removable adhesive cover 146 has protruding tab 148. To adhere hollow cylinder 120 to second face 110 of insulation blanket 102, removable adhesive cover 146 is removed from insulation insert 116 exposing first adhesive layer 124. When present, protruding tab 148 aids in removal of removable adhesive cover 146 by an operator. In some illustrative examples, protruding tab 148 is not present.

Insulation insert 116 also includes second removable adhesive cover 150. As depicted, second removable adhesive cover 150 has protruding tab 152, wherein second removable adhesive cover 150 contacts second adhesive layer 130. To adhere flange 128 to first face 108 of insulation blanket 102, second removable adhesive cover 150 is removed from insulation insert 116 exposing second adhesive layer 130. When present, protruding tab 152 aids in removal of second removable adhesive cover 150 by an operator. In some illustrative examples, protruding tab 152 is not present.

When insulation insert 116 is installed in insulation blanket 102, insulation insert 116 is adhered to first face 108 and second face 110 of insulation blanket 102. First adhesive layer 124 is exposed to adhere first face 126 of hollow cylinder 120 to second face 110. Second adhesive layer 130 is exposed to adhere second face 132 of disc 134 to first face 108.

First adhesive layer 124 adheres first face 126 of hollow cylinder 120 to an inner surface of second face 110. The inner surface of second face 110 is within insulation blanket 102. Portions of the inner surface of second face 110 contact filler 106.

Second adhesive layer 130 adheres second face 132 of disc 134 to an outer surface of first face 108. The outer surface of first face 108 is an exterior of insulation blanket 102.

When insulation insert 116 is installed, hollow cylinder 120 is contained within insulation blanket 102. When insulation insert 116 is installed, hollow cylinder 120 is held within first hole 154. First hole 154 has first diameter 156. First hole 154 extends through a portion of insulation blanket 102. First hole 154 extends through first face 108 and filler 106.

Second hole 158 extends through a portion of insulation blanket 102. As depicted, second hole 158 extends through second face 110. Second hole 158 has second diameter 160. Second diameter 160 is smaller than first diameter 156 of first hole 154. Second diameter 160 is configured to receive mounting post 145 of stringer clip 118.

In some illustrative examples, first hole 154 and second hole 158 are created in separate processes. In some other illustrative examples, first hole 154 and second hole 158 are created substantially simultaneously. In some illustrative examples in which first hole 154 and second hole 158 are created substantially simultaneously, first hole 154 and second hole 158 are created using dual cutter 162.

Stringer clip 118 is secured to stringer 112 using tension. Stringer clip 118 has mounting post 145 configured to provide an interference fit with hole 144 of hollow cylinder 120.

By installing insulationسealing system 114 during installation of insulation blanket 102 within aircraft 104, a location of insulation insert 116 is selected on the fly. By installing insulation sealing system 114 during installation of insulation blanket 102 within aircraft 104, a location of insulation insert 116 may be changed from an intended location based on variations during installation of insulation blanket 102. By installing insulation sealing system 114 during installation of insulation blanket 102 within aircraft 104, a location of insulation insert 116 may be changed based on design changes to aircraft systems.

Installing insulation sealing system 114 may involve fewer steps than installing conventional sealing systems. Installing insulation sealing system 114 may be less labor intensive than installing conventional sealing systems.

Insulation blanket 102 is pressed against stringer clip 118. First hole 154 and second hole 158 are cut into insulation blanket 102. Insulation insert 116 is adhered to insulation blanket 102. In some illustrative examples, first adhesive layer 124 is adhered to second face 110 and second adhesive layer 130 is adhered to first face 108 substantially simultaneously. In some illustrative examples, first adhesive layer 124 is adhered to second face 110 prior to adhering second adhesive layer 130 to first face 108. In some illustrative examples, first adhesive layer 124 is adhered to second face 110 prior to removing second removable adhesive cover 150 from second adhesive layer 130.

Insulation insert 116 may be manufactured in any desirable fashion. In one illustrative example, insulation insert 116 is formed from sheet of closed cell foam 164 having thickness 166 and second sheet of closed cell foam 168 having thickness 170.

In some illustrative examples, hollow cylinder 120 is punched from sheet of closed cell foam 164. In these illustrative examples, a height of hollow cylinder 120 is the same as thickness 166. First adhesive layer 124 is applied to hollow cylinder 120 in any desirable manner. In some illustrative examples, sheet of closed cell foam 164 includes adhesive 172. In these illustrative examples, when hollow cylinder 120 is cut from sheet of closed cell foam 164, first adhesive layer 124 is formed from adhesive 172. In other illustrative examples, first adhesive layer 124 is applied to hollow cylinder 120 after punching hollow cylinder 120 from sheet of closed cell foam 164.

In some illustrative examples, disc 134 is punched from second sheet of closed cell foam 168. In these illustrative examples, a height of disc 134 is the same as thickness 170. Second adhesive layer 130 is applied to disc 134 in any desirable manner. In some illustrative examples, second sheet of closed cell foam 168 includes adhesive 174. In these illustrative examples, when disc 134 is cut from second sheet of closed cell foam 168, second adhesive layer 130 is formed from adhesive 174. In other illustrative examples, second adhesive layer 130 is applied to disc 134 after punching disc 134 from second sheet of closed cell foam 168.

After forming hollow cylinder 120 and disc 134, hollow cylinder 120 is bonded to disc 134 to form insulation insert 116 comprising hollow cylinder 120, first adhesive layer 124 on first face 126 of hollow cylinder 120, flange 128 extending from hollow cylinder 120, and second adhesive layer 130 on second face 132 of flange 128, wherein flange 128 is formed by disc 134. In some illustrative examples, bonding hollow cylinder 120 to disc 134 comprises adhering hollow cylinder 120 to disc 134 using second adhesive layer 130.

The illustration of manufacturing environment 100 in FIG. 1 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, removable adhesive cover 146 may not include protruding tab 148, and second removable adhesive cover 150 may not include protruding tab 152. As another example, at least one of hole 136 or perforated circle 140 may not be present in disc 134. As yet another example, although disc 134 and hollow cylinder 120 are both depicted as being formed of closed cell foam 122, in some illustrative examples, disc 134 and hollow cylinder 120 may be formed of different materials.

In some non-depicted illustrative examples, a cylindrical standoff may be present within hollow cylinder 120. In some illustrative examples, the cylindrical standoff is bonded within hollow cylinder 120.

Figure 2:
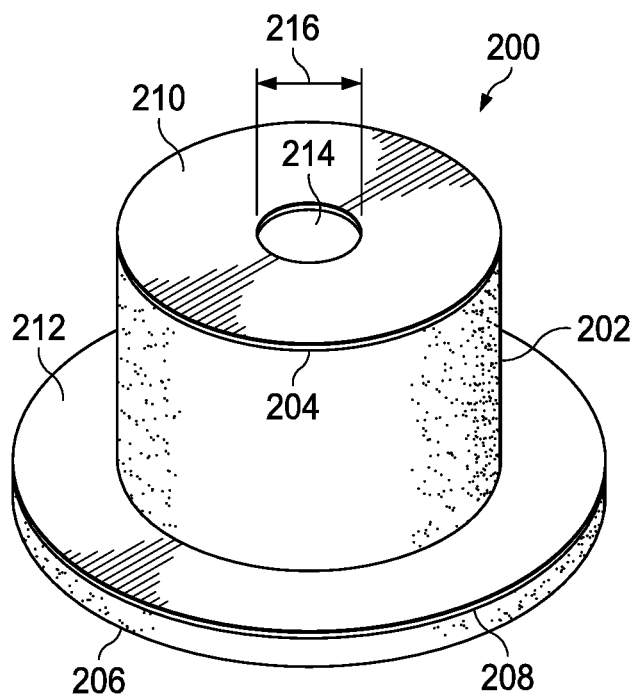
FIG. 2 is an illustration of a top perspective view of an insulation insert in accordance with an illustrative embodiment.
Figure 3:
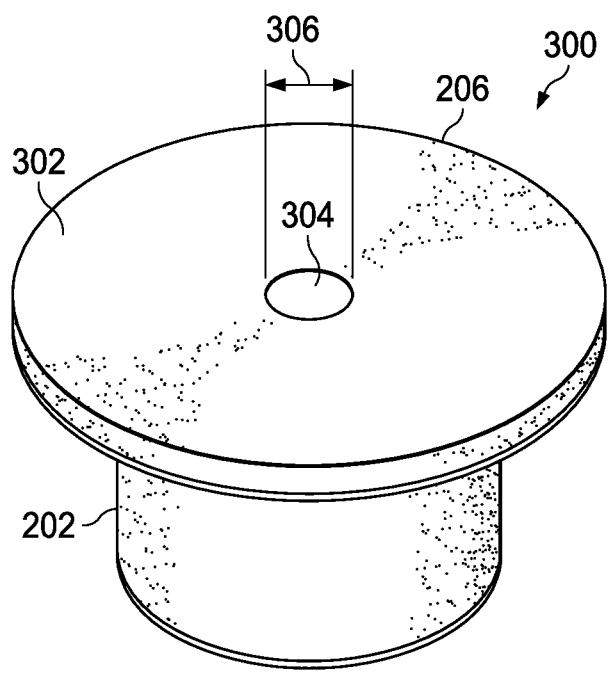
FIG. 3 is an illustration of a bottom perspective view of an insulation insert in accordance with an illustrative embodiment.
Figure 4:
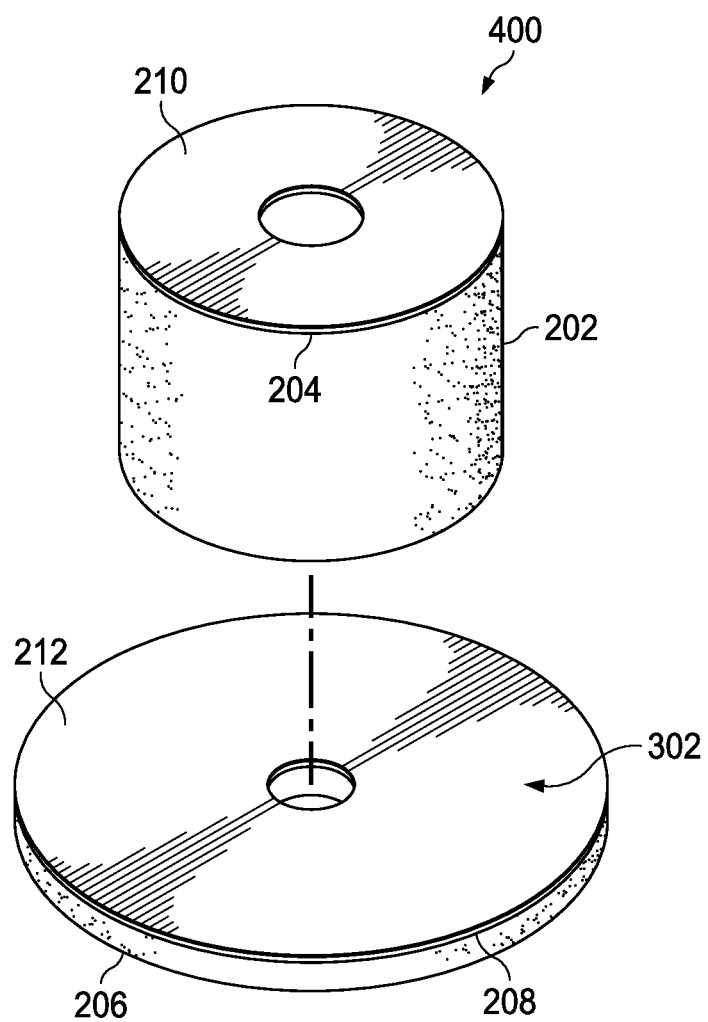
FIG. 4 is an illustration of an exploded view of an insulation insert in accordance with an illustrative embodiment.

FIGS. 2-4 are illustrations of one example of a physical implementation of an insulation insert. In the illustrative examples, the same reference number may be used in more than one figure. This reuse of a reference numeral in different figures represents the same element in the different figures.

Turning now to FIG. 2, an illustration of a top perspective view of an insulation insert is depicted in accordance with an illustrative embodiment. Insulation insert 200 is a physical implementation of insulation insert 116 of FIG. 1. Insulation insert 200 may be installed in an insulation blanket, such as insulation blanket 102 of FIG. 1.

Insulation insert 200 comprises hollow cylinder 202, first adhesive layer 204, flange 206, and second adhesive layer 208. Hollow cylinder 202 is formed of a closed cell foam. First adhesive layer 204 is on first face 210 of hollow cylinder 202.

Flange 206 is formed of a closed cell foam. Flange 206 extends from hollow cylinder 202. Second adhesive layer 208 is on second face 212 of flange 206.

As depicted, hollow cylinder 202 has hole 214. Diameter 216 of hole 214 of hollow cylinder 202 is configured to provide an interference fit with a mounting post of a stringer clip, such as mounting post 145 of stringer clip 118 of FIG. 1.

Turning now to FIG. 3, an illustration of a bottom perspective view of an insulation insert is depicted in accordance with an illustrative embodiment. View 300 is a bottom perspective view of insulation insert 200 of FIG. 2. As depicted, flange 206 is disc 302 adhered to hollow cylinder 202.

Disc 302 has hole 304 with diameter 306. Hole 304 is concentric with disc 302. Diameter 306 is configured to receive a fastener.

Turning now to FIG. 4, an illustration of an exploded view of an insulation insert is depicted in accordance with an illustrative embodiment. View 400 is an exploded view of insulation insert 200 of FIG. 2. As depicted, second adhesive layer 208 extends across second face 212 of flange 206 to bond hollow cylinder 202 to disc 302.

The illustration of insulation insert 200 in FIGS. 2-4 is not meant to imply physical or architectural limitations to the manner in which an illustrative example may be implemented. For example, disc 302 may not have hole 304. In some illustrative examples, disc 302 may have a perforated circle in place of hole 304. As another example, disc 302 may have a perforated circle in addition to hole 304.

Figure 5:
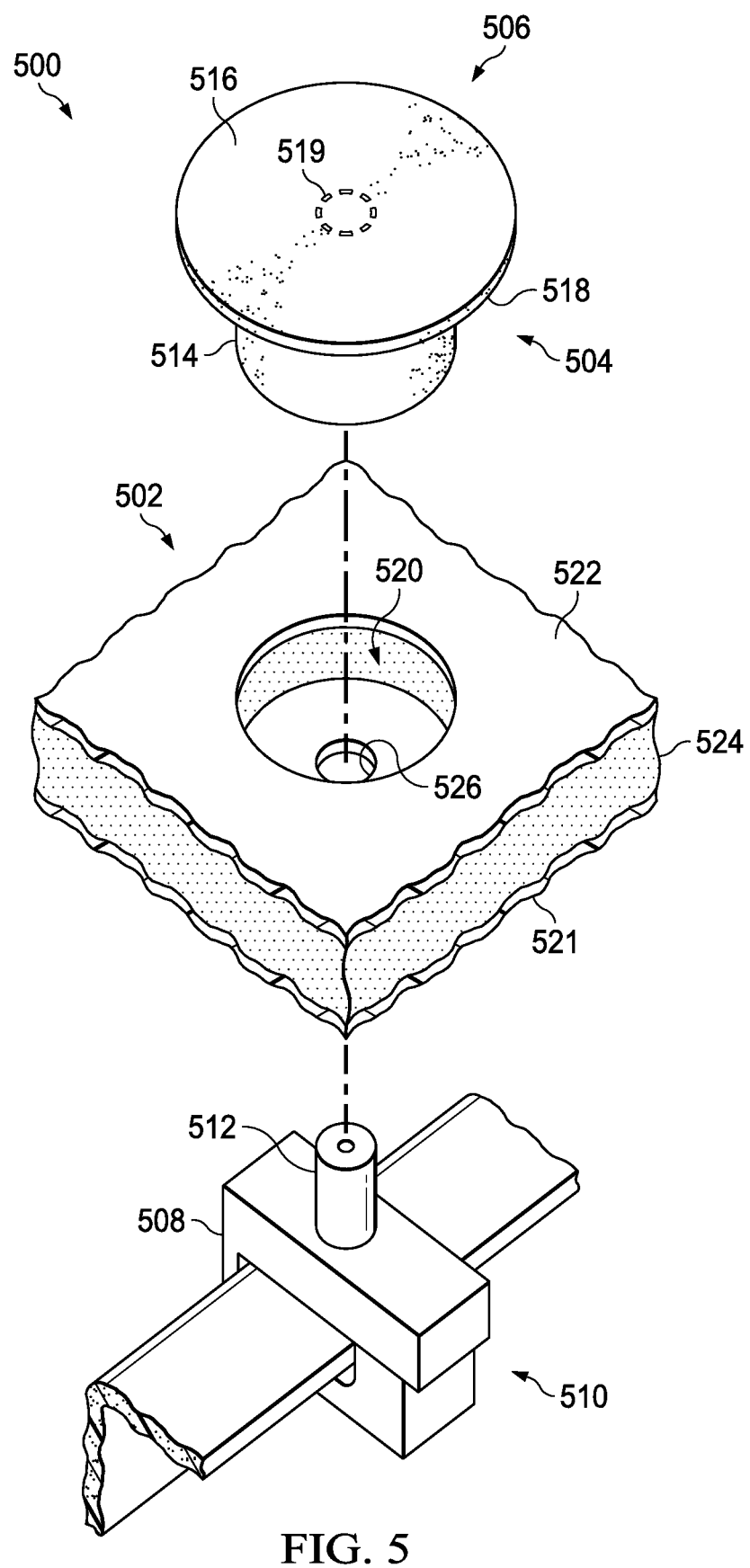
FIG. 5 is an illustration of a perspective exploded view of an insulation sealing system and an insulation blanket in accordance with an illustrative embodiment.

Turning now to FIG. 5, an illustration of a perspective exploded view of an insulation sealing system and an insulation blanket is depicted in accordance with an illustrative embodiment. View 500 includes insulation blanket 502 and insulation sealing system 504. Insulation sealing system 504 includes insulation insert 506 and stringer clip 508.

Stringer clip 508 is connected to stringer 510 using tension. Stringer clip 508 has mounting post 512. Mounting post 512 may be used to form an attach point for an aircraft system, such as a duct, a tube, or a wire bundle.

Insulation insert 506 comprises hollow cylinder 514 and flange 516 extending from hollow cylinder 514. Flange 516 is formed by disc 518 bonded to hollow cylinder 514. In this illustrative example, disc 518 does not have a hole extending through disc 518. As depicted, perforations 519 are present in disc 518.

Hollow cylinder 514 is inserted into first hole 520 in insulation blanket 502. A first adhesive layer on hollow cylinder 514 is adhered to second face 521 of insulation blanket 502. A second adhesive layer on flange 516 is adhered to first face 522 of insulation blanket 502.

First hole 520 extends through first face 522 and filler 524 of insulation blanket 502. Second hole 526 extends through second face 521. Mounting post 512 of stringer clip 508 extends through second hole 526. Mounting post 512 is configured to have an interference fit with a hole extending through hollow cylinder 514 of insulation insert 506.

Figure 6:
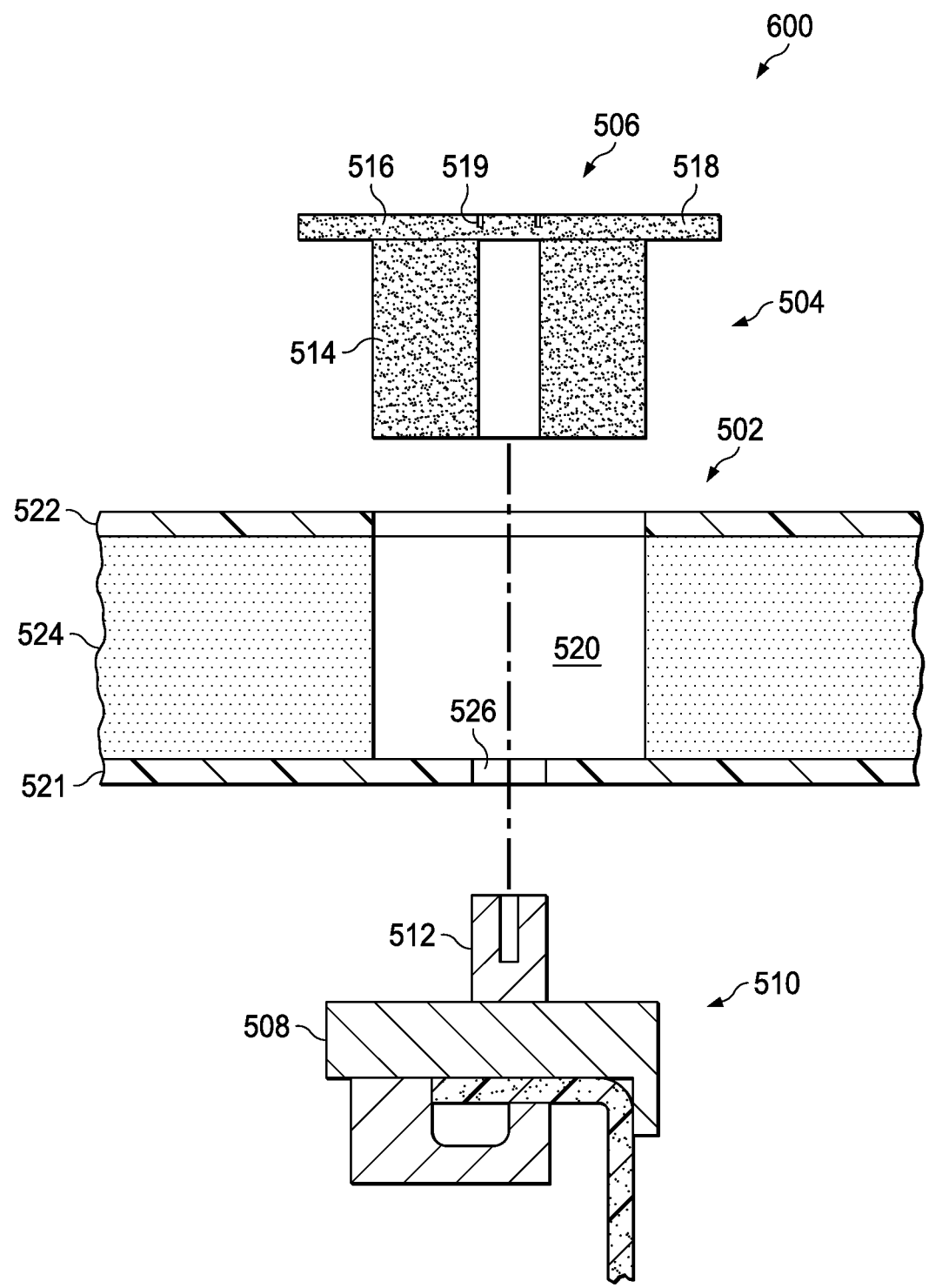
FIG. 6 is an illustration of a cross-sectional exploded view of an insulation sealing system and an insulation blanket in accordance with an illustrative embodiment.

Turning now to FIG. 6, an illustration of a cross-sectional exploded view of an insulation sealing system and an insulation blanket is depicted in accordance with an illustrative embodiment. View 600 is a cross-sectional view of insulation sealing system 504 and insulation blanket 502 of FIG. 5.

As depicted, perforations 519 in disc 518 extend partially through disc 518. In some illustrative examples, a portion of disc 518 may be removed by "punching out" the perforated material.

The illustration of insulation insert 506 in FIGS. 5-6 is not meant to imply physical or architectural limitations to the manner in which an illustrative example may be implemented. For example, a hole may be present in disc 518 in addition to perforations 519 in disc 518. In other illustrative examples, perforations 519 are not present.

In some non-depicted illustrative examples, a cylindrical standoff may be present within hollow cylinder 514. In some illustrative examples, the cylindrical standoff is bonded within hollow cylinder 514.

Figure 7:
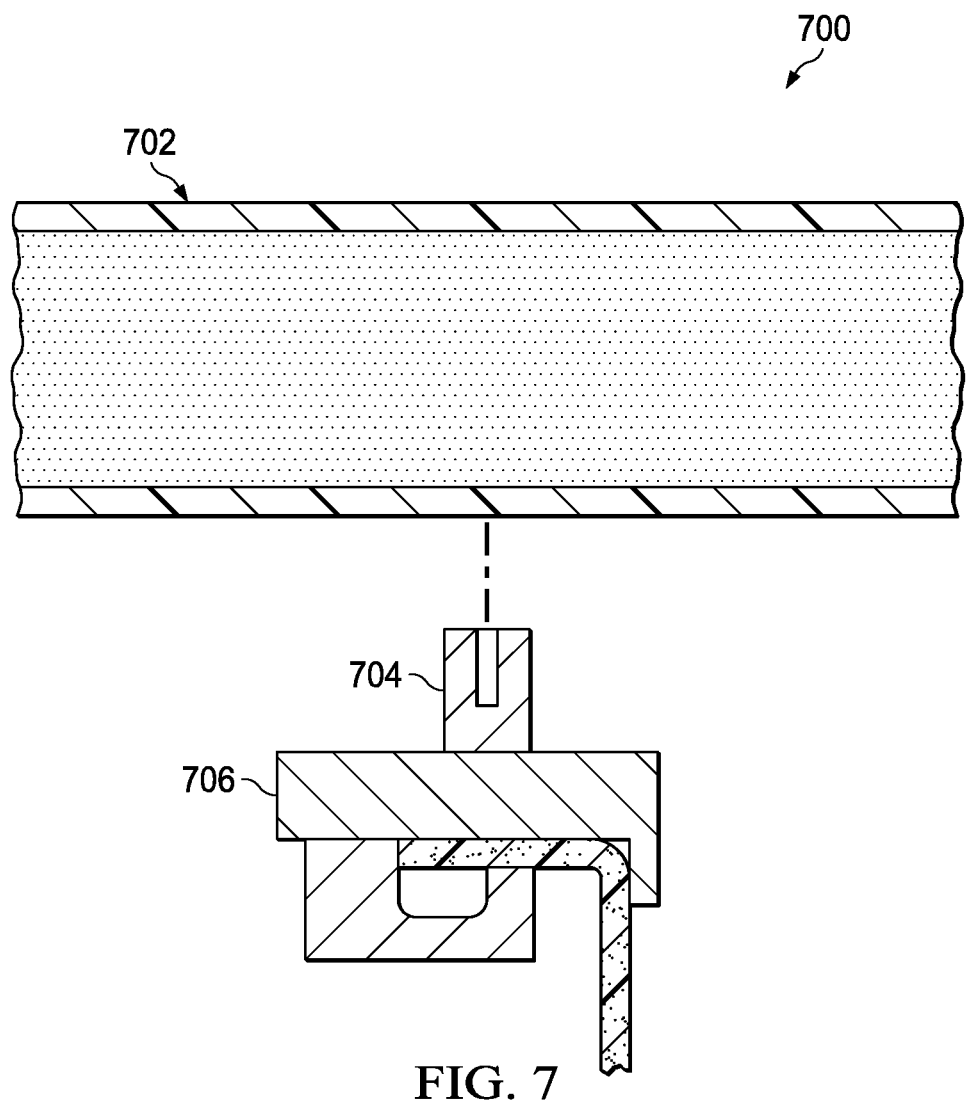
FIG. 7 is an illustration of a cross-sectional view of an insulation blanket during installation on a stringer clip in accordance with an illustrative embodiment.

Turning now to FIG. 7, an illustration of a cross-sectional view of an insulation blanket during installation on a stringer clip is depicted in accordance with an illustrative embodiment. In view 700, insulation blanket 702 is pressed against mounting post 704 of stringer clip 706. Insulation blanket 702 is a physical implementation of insulation blanket 102 of FIG. 1.

Figure 8:
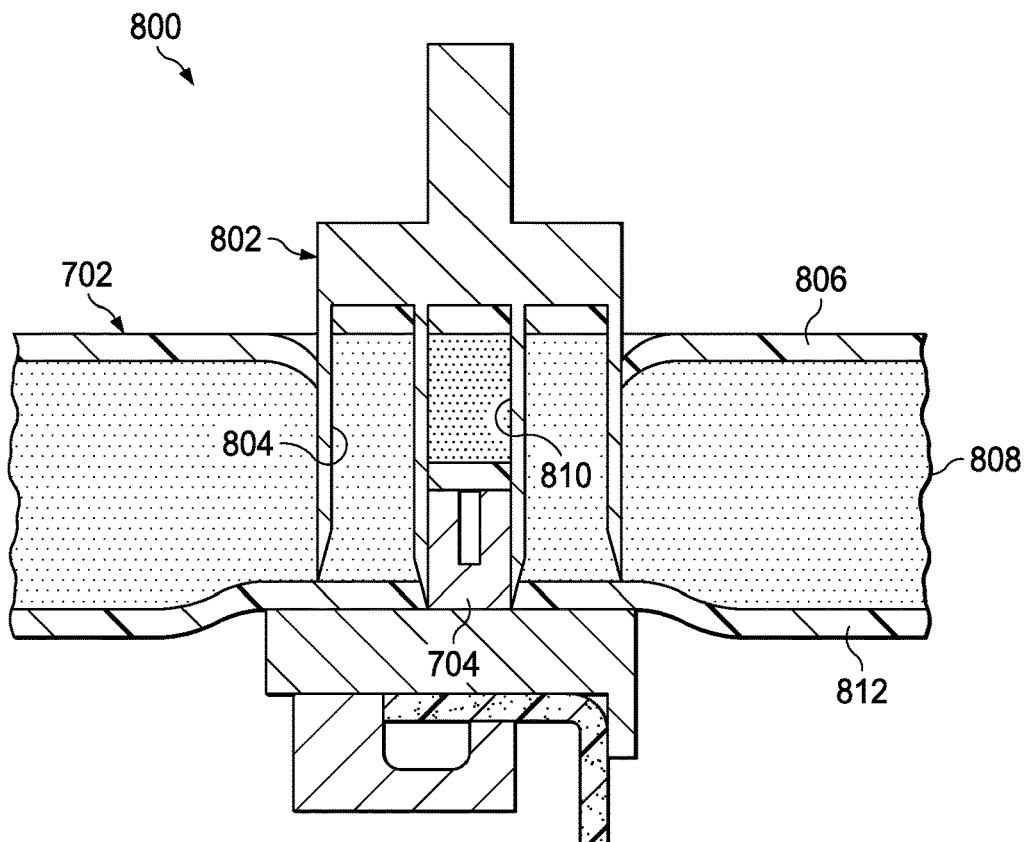
FIG. 8 is an illustration of a cross-sectional view of cutting a first hole and a second hole in an insulation blanket during installation on a stringer clip in accordance with an illustrative embodiment.

Turning now to FIG. 8, an illustration of a cross-sectional view of cutting a first hole and a second hole in an insulation blanket during installation on a stringer clip is depicted in accordance with an illustrative embodiment. In view 800, dual cutter 802 cuts first hole 804 into first face 806 and filler 808 of insulation blanket 702. Dual cutter 802 is a physical implementation of dual cutter 162 of FIG. 1.

In view 800, dual cutter 802 cuts second hole 810 into second face 812 of insulation blanket 702. As depicted, first hole 804 has a greater diameter than second hole 810. As depicted, mounting post 704 extends through second hole 810.

Figure 9:
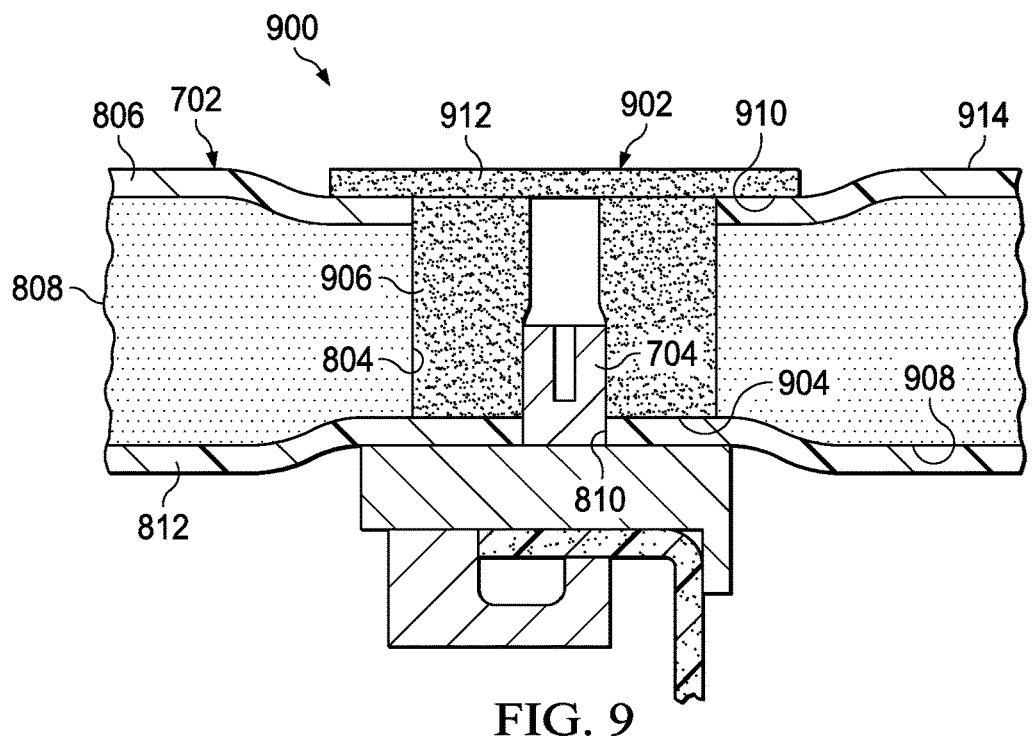
FIG. 9 is an illustration of a cross-sectional view of adhering an insulation insert to an insulation blanket during installation on a stringer clip in accordance with an illustrative embodiment.

Turning now to FIG. 9, an illustration of a cross-sectional view of adhering an insulation insert to an insulation blanket during installation on a stringer clip is depicted in accordance with an illustrative embodiment. In view 900, insulation insert 902 has been installed. A first adhesive layer on first face 904 of hollow cylinder 906 of insulation insert 902 is applied to inside surface 908 of second face 812 of insulation blanket 702. First face 904 of hollow cylinder 906 is adhered to second face 812 of insulation blanket 702 using the first adhesive layer. A second adhesive layer on second face 910 of flange 912 of insulation insert 902 is applied to outside surface 914 of first face 806 of insulation blanket 702. Second face 910 of flange 912 is adhered to first face 806 of insulation blanket 702 using the second adhesive layer.

The illustration of insulation insert 902 in FIG. 9 is not meant to imply physical or architectural limitations to the manner in which an illustrative example may be implemented. In this illustrative example, flange 912 of insulation insert 902 has neither perforations nor a hole. In non-depicted examples, at least one of perforations or a hole is present in the disc forming flange 912. Additionally, in some non-depicted illustrative examples, a cylindrical standoff may be present within hollow cylinder 906 of insulation insert 902.

Figure 10:
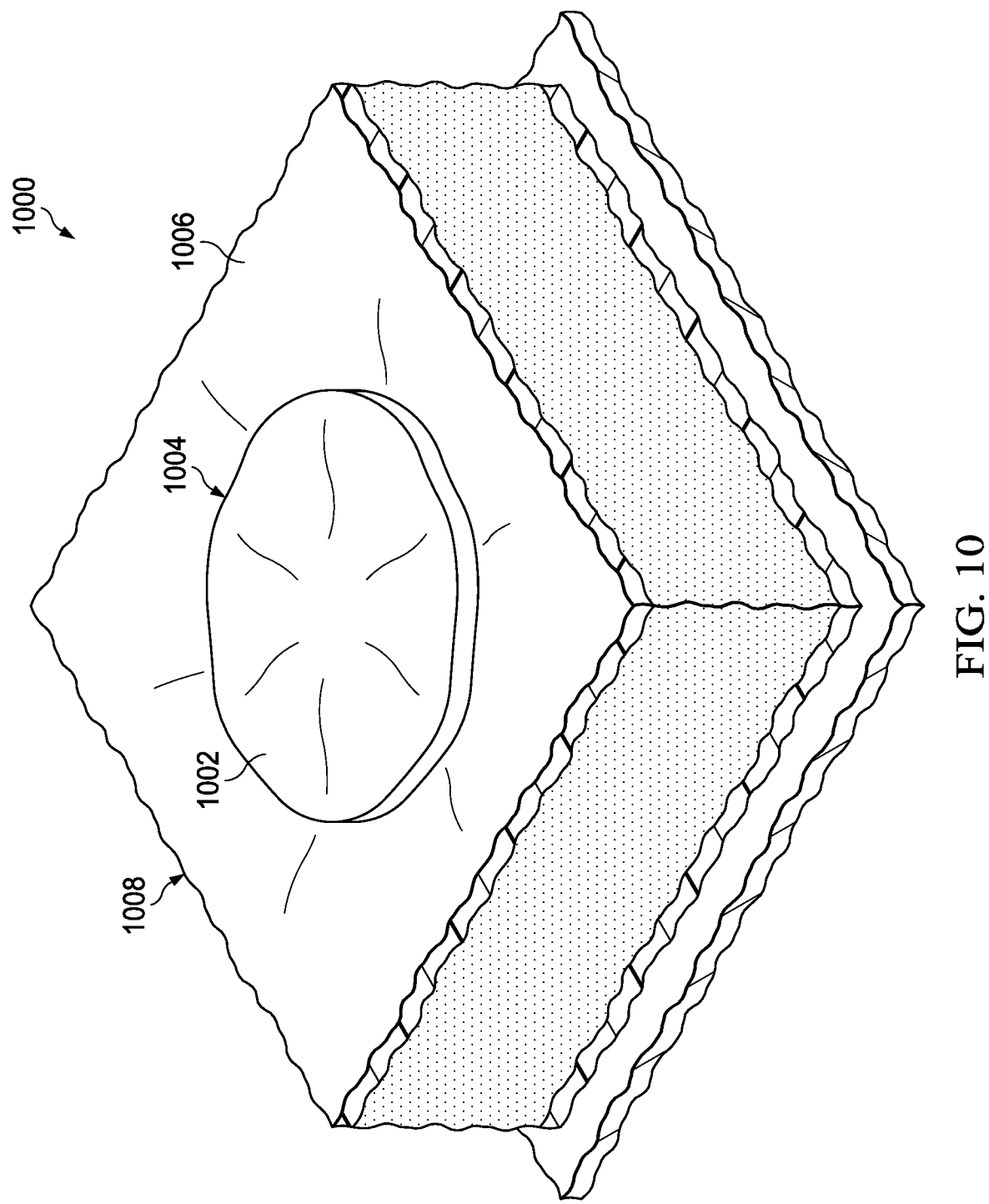
FIG. 10 is an illustration of a top perspective view of an insulation sealing system in an insulation blanket in accordance with an illustrative embodiment.

Turning now to FIG. 10, an illustration of a top perspective view of an insulation sealing system in an insulation blanket is depicted in accordance with an illustrative embodiment. In view 1000, flange 1002 of insulation insert 1004 is adhered to first face 1006 of insulation blanket 1008. Insulation insert 1004 is a physical implementation of insulation insert 116 of FIG. 1.

As depicted, insulation insert 1004 is formed of a closed cell foam and is flexible. As insulation blanket 1008 bends and moves, flange 1002 also bends and moves. Insulation insert 1004 seals a penetration through insulation blanket 1008.

In some illustrative examples, a fastener will be inserted through insulation insert 1004 to attach a structure, such as a duct, a pipe, or a wiring bundle, to a stringer beneath insulation blanket 1008. In these illustrative examples, the fastener pierces insulation insert 1004 to attach a structure to a stringer beneath insulation blanket 1008. In some non-depicted illustrative examples, a hole is present. In these illustrative examples, a fastener may have an interference fit with the hole. In other non-depicted examples, perforations may be present with or without a hole.

Figure 11:
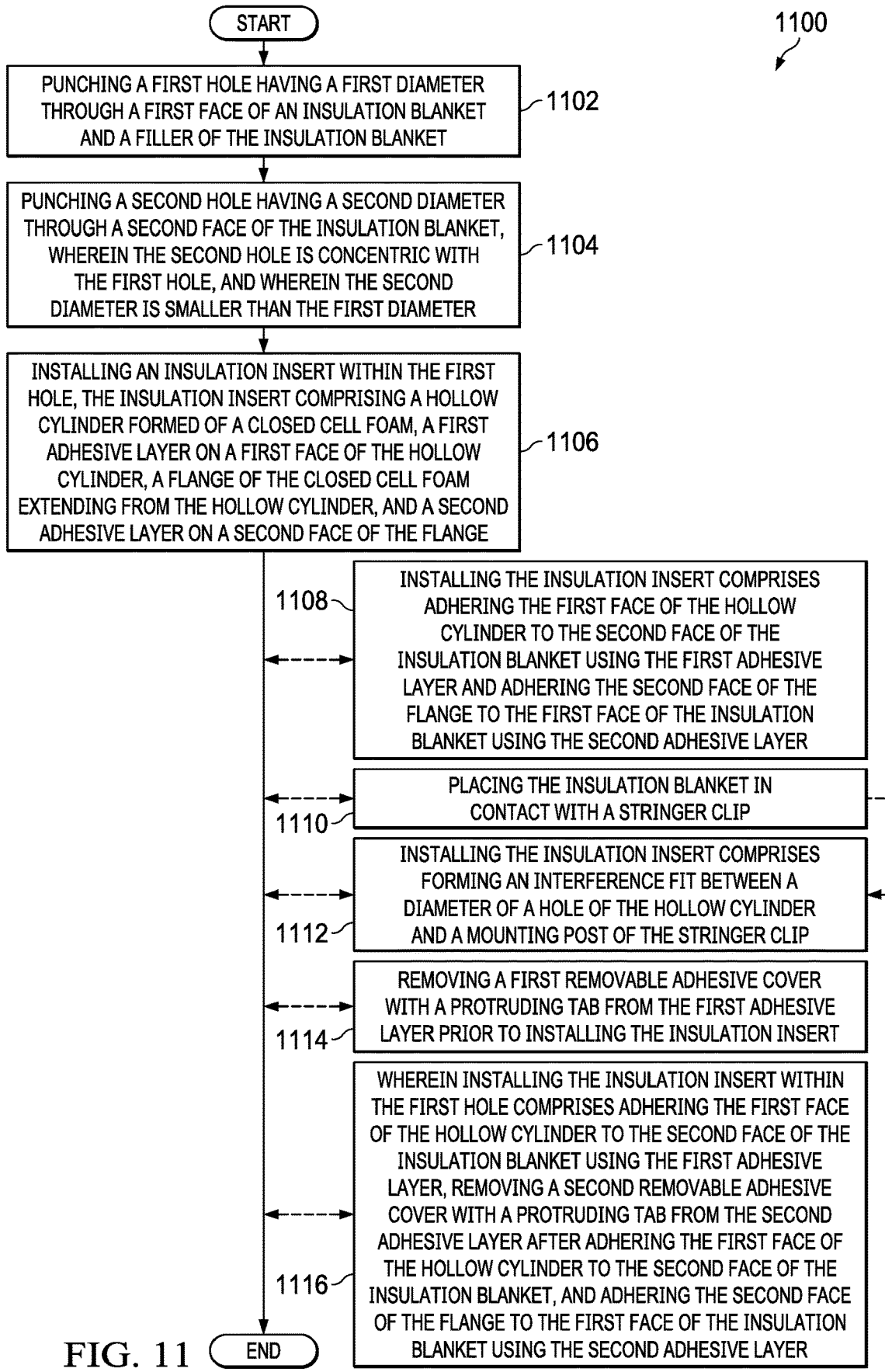
FIG. 11 is an illustration of a flowchart of a method for installing an insulation blanket in accordance with an illustrative embodiment.

The different components shown in FIGS. 2-10 may be combined with components in FIG. 1, used with components in FIG. 1, or a combination of the two. Additionally, some of the components in FIGS. 2-10 may be illustrative examples of how components shown in block form in FIG. 1 may be implemented as physical structures. Turning now to FIG. 11, an illustration of a flowchart of a method for installing an insulation blanket is depicted in accordance with an illustrative embodiment. Method 1100 may be used to install insulation insert 116 of FIG. 1 into insulation blanket 102 of FIG. 1. Method 1100 may be used to install insulation insert 200 of FIGS. 2-4 into an insulation blanket. Method 1100 may be used to install insulation insert 506 in insulation blanket 502 of FIGS. 5-6. FIGS. 8-9 may depict an insulation blanket following some operations of method 1100.

Method 1100 punches a first hole having a first diameter through a first face of an insulation blanket and a filler of the insulation blanket (operation 1102). Method 1100 punches a second hole having a second diameter through a second face of the insulation blanket, wherein the second hole is concentric with the first hole, and wherein the second diameter is smaller than the first diameter (operation 1104). In some illustrative examples, the first hole and the second hole are punched substantially simultaneously by a dual punch tool. In other illustrative examples, the first hole and the second hole are punched in subsequent operations by two different punch tools.

Method 1100 installs an insulation insert within the first hole, the insulation insert comprising a hollow cylinder formed of a closed cell foam, a first adhesive layer on a first face of the hollow cylinder, a flange of the closed cell foam extending from the hollow cylinder, and a second adhesive layer on a second face of the flange (operation 1106). Afterwards, method 1100 terminates.

In some illustrative examples, installing the insulation insert comprises adhering the first face of the hollow cylinder to the second face of the insulation blanket using the first adhesive layer and adhering the second face of the flange to the first face of the insulation blanket using the second adhesive layer (operation 1108). In some of these illustrative examples, the first face of the hollow cylinder is adhered to the second face of the insulation blanket and the second face of the flange is adhered to the first face of the insulation blanket in one step. In some of these illustrative examples, the first face of the hollow cylinder is adhered to the second face of the insulation blanket, and the second face of the flange is adhered to the first face of the insulation blanket in two steps.

In some illustrative examples, method 1100 places the insulation blanket in contact with a stringer clip (operation 1110). In some illustrative examples, installing the insulation insert comprises forming an interference fit between a diameter of a hole of the hollow cylinder and a mounting post of the stringer clip (operation 1112).

In some illustrative examples, method 1100 removes a first removable adhesive cover with a protruding tab from the first adhesive layer prior to installing the insulation insert (operation 1114). In some illustrative examples, installing the insulation insert within the first hole comprises adhering the first face of the hollow cylinder to the second face of the insulation blanket using the first adhesive layer, removing a second removable adhesive cover with a protruding tab from the second adhesive layer after adhering the first face of the hollow cylinder to the second face of the insulation blanket, and adhering the second face of the flange to the first face of the insulation blanket using the second adhesive layer (operation 1116).

Figure 12:
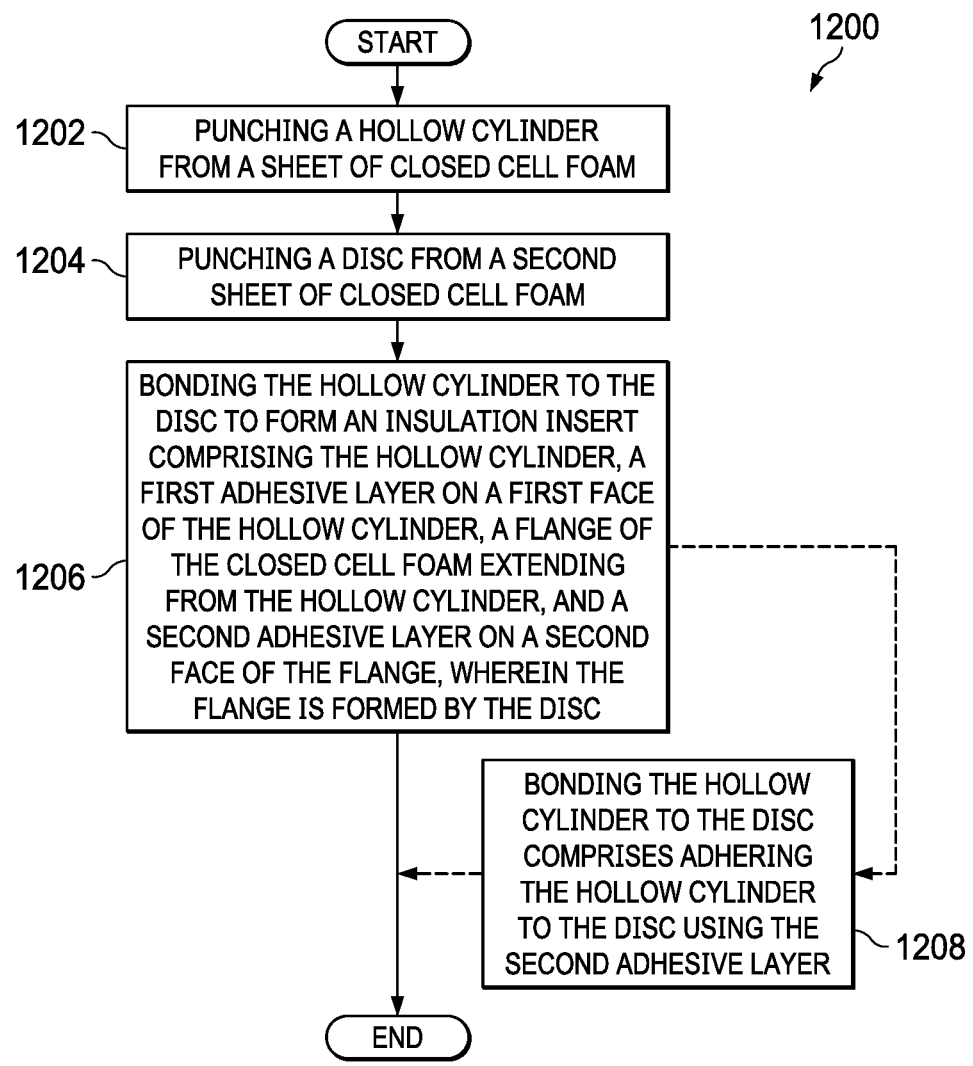
FIG. 12 is an illustration of a flowchart of a method for manufacturing an insulation insert in accordance with an illustrative embodiment.

Turning now to FIG. 12, an illustration of a flowchart of a method for manufacturing an insulation insert is depicted in accordance with an illustrative embodiment. Method 1200 may be used to form insulation insert 116 of FIG. 1. Method 1200 may be used to form insulation insert 200 of FIGS. 2-4. Method 1200 may be used to form insulation insert 506 of FIGS. 5-6. Method 1200 may be used to form insulation insert 902 of FIG. 9. Method 1200 may be used to form insulation insert 1004 of FIG. 10.

Method 1200 punches a hollow cylinder from a sheet of closed cell foam (operation 1202). In some illustrative examples, the sheet of closed cell foam has a layer of adhesive and a cover contacting the layer of adhesive.

Method 1200 punches a disc from a second sheet of closed cell foam (operation 1204). In some illustrative examples, the second sheet of closed cell foam has a second layer of adhesive and a cover contacting the second layer of adhesive.

Method 1200 bonds the hollow cylinder to the disc to form an insulation insert comprising the hollow cylinder, a first adhesive layer on a first face of the hollow cylinder, a flange extending from the hollow cylinder, and a second adhesive layer on a second face of the flange, wherein the flange is formed by the disc (operation 1206). Afterwards, method 1200 terminates.

In some illustrative examples, bonding the hollow cylinder to the disc comprises adhering the hollow cylinder to the disc using the second adhesive layer (operation 1208). In other illustrative examples, bonding the hollow cylinder to the disc is performed using a different material than the second adhesive layer.

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 1100 or method 1200 are performed. For example, operations 1108 through 1116 of FIG. 11 may be optional. As another example, operation 1208 of FIG. 12 may be optional.

Figure 13:
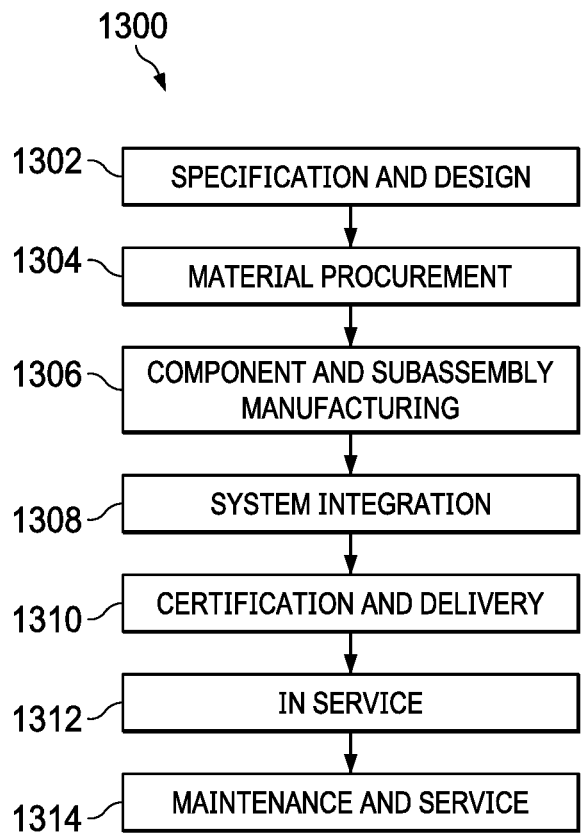
FIG. 13 is an illustration of an aircraft manufacturing and service method in the form of a block diagram in accordance with an illustrative embodiment.
Figure 14:
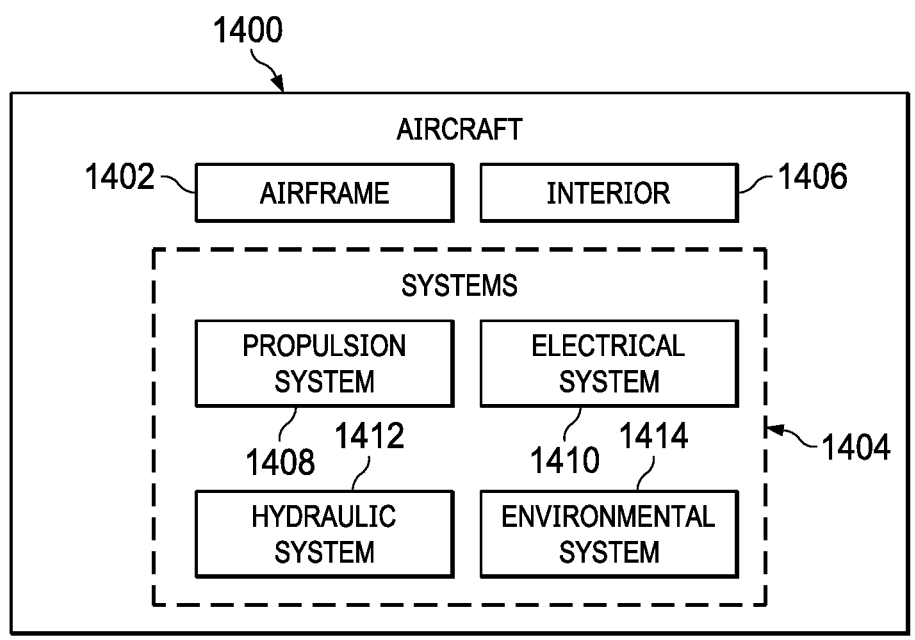
FIG. 14 is an illustration of an aircraft in the form of a block diagram in which an illustrative embodiment may be implemented.

The illustrative examples of the present disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative example. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 takes place. Thereafter, aircraft 1400 may go through certification and delivery 1310 in order to be placed in service 1312. While in service 1312 by a customer, aircraft 1400 is scheduled for maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with a plurality of systems 1404 and interior 1406. Examples of systems 1404 include one or more of propulsion system 1408, electrical system 1410, hydraulic system 1412, and environmental system 1414. Any number of other systems may be included.

Apparatuses and methods embodied herein may be employed during at least one of the stages of aircraft manufacturing and service method 1300. One or more illustrative examples may be used during component and subassembly manufacturing 1306, system integration 1308, or maintenance and service 1314 of FIG. 13. For example, insulation sealing system 114 of FIG. 1 may be used to form attachment point 117 of FIG. 1 through insulation blanket 102 of FIG. 1 during component and subassembly manufacturing 1306. As another example, insulation sealing system 114 may be used to install insulation blanket 102 as a replacement part during maintenance and service 1314 of FIG. 13.

Apparatuses and methods embodied herein may be employed in manufacturing at least one component of aircraft 1400. For example, insulation blanket 102 may be attached to airframe 1402 to insulate interior 1406.

The illustrative examples create a seal around a penetration through an airplane insulation blanket. The seal created by the insulation sealing system is water-tight or substantially water-tight. Installing the seal is faster and has fewer steps than conventional attach points. The illustrative examples provide enhanced sealing compared to current designs. The illustrative examples may be lighter than current designs. The illustrative examples may be less expensive than conventional attach points.

The illustrative examples provide a foam plug, or insulation insert. The foam plug may be lighter than conventional solid plastic parts. The foam plug is shaped like a "top hat". The top of the top hat, or hollow cylinder, has a hole sized to give an interference fit with the stringer clip mounting post. Bonded onto the cylindrical "top" of the top hat is a thinner disc-shaped layer which resembles the brim of a top hat.

The plug is made of a closed cell foam, for example PVDF foam. The top of the "top hat" has an adhesive layer which can be exposed by peeling off a cover. The top of the "brim" also has an adhesive layer. If desired, the "top hat" shape allows the plug, or insulation insert, to bond to both faces of the insulation blanket in a single step.

The illustrative examples may be installed using three steps. The insulation blanket is pushed into place without mounting the grommets. A core is cut from the insulation blanket using at least one coring tool such that two cores are cut, one larger than the other. This may be done with a single dual cutter tool, or two tools.

The top hat adhesive, or first adhesive layer, is exposed and the top hat is pushed into the cylindrical hole, adhering to the back/outboard face of the insulation blanket, creating a seal there. The brim adhesive, or second adhesive layer, is exposed, and adheres to the front/inboard face of the blanket, creating a seal there. The interference fit over the stringer clip mounting post retains the insulation blanket in this location.

In some illustrative examples, the disc-shaped brim may be pre-manufactured with a hole size for a fastener, a standoff, or a spacer to be attached to the stringer clip mounting post. In some illustrative examples, the disc-shaped brim may have no hole at all, and the fasteners are installed by pressing the metal fastener against the foam disc until it penetrates. In some illustrative examples, the disc-shaped brim may have a center perforation which penetrates partly through the foam. The perforation does not penetrate all the way, as this penetration would create a leak path. The perforation provides a starting point for a fastener piercing the foam disc. In some illustrative examples, the disc-shaped brim may have a circular pattern of perforations which penetrate partly through the foam, creating a tear-out disc for a standoff or spacer to mount to the stringer clip post.

In some illustrative examples, the peel-off adhesive covers would have protruding tabs for ease of removal. This is a removal convenience for the "top" of the "top hat", or first adhesive material. The "brim" adhesive, or second adhesive material, however, might benefit significantly from an exposed tab, because an installer would be able to peel the cover off the brim adhesive after the top hat is installed onto the stringer clip mounting post and adhered to the outboard face. By removing the cover from the brim adhesive after being adhered to the outboard face, the installer would only have to focus on bonding one face at a time instead of both faces. Adhering one face of the "top hat" at a time may improve quality by making it easier to avoid wrinkles.

The illustrative examples provide at least one of: reduce installation costs, improve water tightness, and reduce aircraft weight. The illustrative examples do not require grommets to be pre-installed onto the stringer clips, eliminating some conventional installation steps.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system configured to seal an insulation blanket, such that the system comprises:
    an insulation insert that comprises:
        a hollow cylinder having a first diameter, the hollow cylinder formed of a closed cell foam that comprises a first face having the first diameter, a second face having the first diameter and an opening, co-centric with the hollow cylinder, that extends through the hollow cylinder including both the first face of the hollow cylinder and the second face of the hollow cylinder, such that the first face of the hollow cylinder faces away from the second face of the hollow cylinder;
        a disc connected to the second face of the hollow cylinder, the disc formed of a second closed cell foam and forming a flange extending from the hollow cylinder;
        a first adhesive layer on the first face of the hollow cylinder configured to pass through a first hole that defines a second diameter, equal to the first diameter, in a first face of the insulation blanket, and adhere to an interior side of a second face of the insulation blanket; and
        a second adhesive layer on a side of the disc that both connects the disc to the second face of the hollow cylinder and connects the disc to an exterior side of the first face of the insulation blanket; and
    a stringer clip comprising a mounting post passing through the first face of the hollow cylinder providing an interference fit within the opening of the hollow cylinder.

2. The system of claim 1, wherein the disc of the insulation insert seals the first face of the insulation blanket.

3. The system of claim 1, wherein a diameter of the disc exceeds the first diameter of the hollow cylinder.

4. The system of claim 3, wherein the diameter of the disc exceeds the second diameter of the first hole in the first face of the insulation blanket.

5. An insulation insert that comprises:
    a hollow cylinder having a first diameter, the hollow cylinder formed of a first closed cell foam that comprises a first face having the first diameter, a second face having the first diameter and an opening, co-centric with the hollow cylinder, that extends through the hollow cylinder including both the first face of the hollow cylinder and the second face of the hollow cylinder, such that the first face of the hollow cylinder faces away from the second face of the hollow cylinder and the opening is configured to provide an interference fit within the hollow cylinder around a mounting post of a stringer clip;
    a disc connected to the second face of the hollow cylinder, the disc formed of a second closed cell foam and forming a flange extending from the hollow cylinder;
    a first adhesive layer on the first face of the hollow cylinder configured to pass through a first hole in a first face of an insulation blanket and adhere to an interior side of a second face of the insulation blanket, such that a diameter of the first adhesive layer and a diameter of the first hole each equals the first diameter; and
    a second adhesive layer on a side of the disc that both connects the disc to the second face of the hollow cylinder and connects the disc to an exterior side of the first face of the insulation blanket.

6. The insulation insert of claim 5, wherein a diameter of the disc exceeds the first diameter of the hollow cylinder.

7. The insulation insert of claim 6, wherein the diameter of the disc exceeds the diameter of the first hole in the first face of the insulation blanket.

8. The insulation insert of claim 6, wherein the disc comprises a second hole completely through and concentric with the disc.

9. The insulation insert of claim 8, wherein the second hole is configured to receive a fastener.

10. The insulation insert of claim 6, wherein the disc comprises a perforated circle concentric with the disc, wherein the perforated circle extends partially through the second closed cell foam of the disc.

11. The insulation insert of claim 5, wherein the mounting post extends from a stringer clip.

12. The insulation insert of claim 5 further comprising:
    a removable adhesive cover with a protruding tab, wherein the removable adhesive cover contacts the first adhesive layer.

13. The insulation insert of claim 12 further comprising:
    a second removable adhesive cover with a second protruding tab, wherein the second removable adhesive cover contacts the second adhesive layer.

14. An apparatus, comprising:
    an insulation blanket comprising a first face having an exterior side, a first hole and a second face having an interior side;
    an insulation insert that comprises:
        a hollow cylinder having a first diameter, the hollow cylinder formed of a closed cell foam that comprises a first face having the first diameter, a second face having the first diameter and an opening, co-centric with the hollow cylinder, that extends through the hollow cylinder including both the first face of the hollow cylinder and the second face of the hollow cylinder, such that the first face of the hollow cylinder faces away from the second face of the hollow cylinder;

a disc connected to the second face of the hollow cylinder, the disc formed of a second closed cell foam and forming a flange extending from the hollow cylinder;

a first adhesive layer on the first face of the hollow cylinder configured to pass through the first hole of the insulation blanket, the first hole having a second diameter, wherein the second diameter is equal to the first diameter, in a first face of the insulation blanket, and adhere to an interior side of a second face of the insulation blanket; and a second adhesive layer on a side of the disc that both connects the disc to the second face of the hollow cylinder and connects the disc to an exterior side of the first face of the insulation blanket; and a stringer clip comprising a mounting post passing through the first face of the hollow cylinder providing an interference fit within the opening of the hollow cylinder.

15. The apparatus of claim 14, wherein a diameter of the disc exceeds the first diameter of the hollow cylinder.

16. The apparatus of claim 15, wherein the diameter of the disc exceeds the diameter of the first hole in the first face of the insulation blanket.

17. The apparatus of claim 15, wherein the disc comprises a second hole completely through and concentric with the disc.

18. The apparatus of claim 17, wherein the second hole is configured to receive a fastener.

19. The apparatus of claim 15, wherein the disc comprises a perforated circle concentric with the disc, wherein the perforated circle extends partially through the second closed cell foam of the disc.

20. The apparatus of claim 14, wherein the mounting post extends from the stringer clip.

21. The apparatus of claim 14 further comprising:

a removable adhesive cover with a protruding tab, wherein the removable adhesive cover contacts the first adhesive layer.

22. The apparatus of claim 21 further comprising:

a second removable adhesive cover with a second protruding tab, wherein the second removable adhesive cover contacts the second adhesive layer.

* * * * *